March 3, 1931.  F. W. JUHL  1,794,695
SAW SETTING MACHINE
Filed April 19, 1929   2 Sheets-Sheet 1
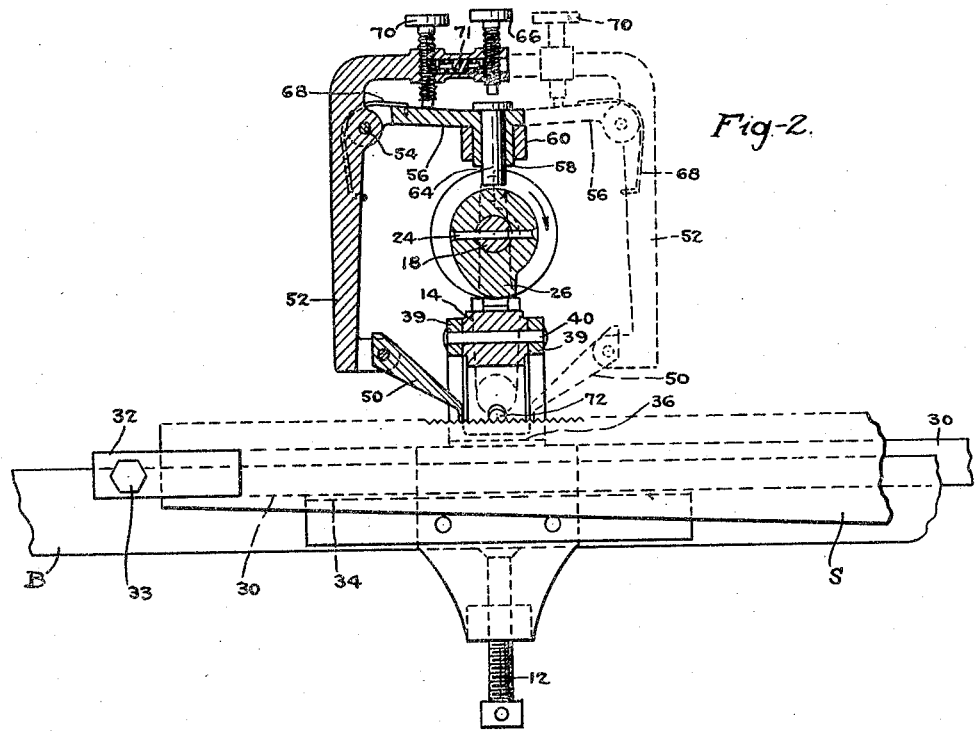
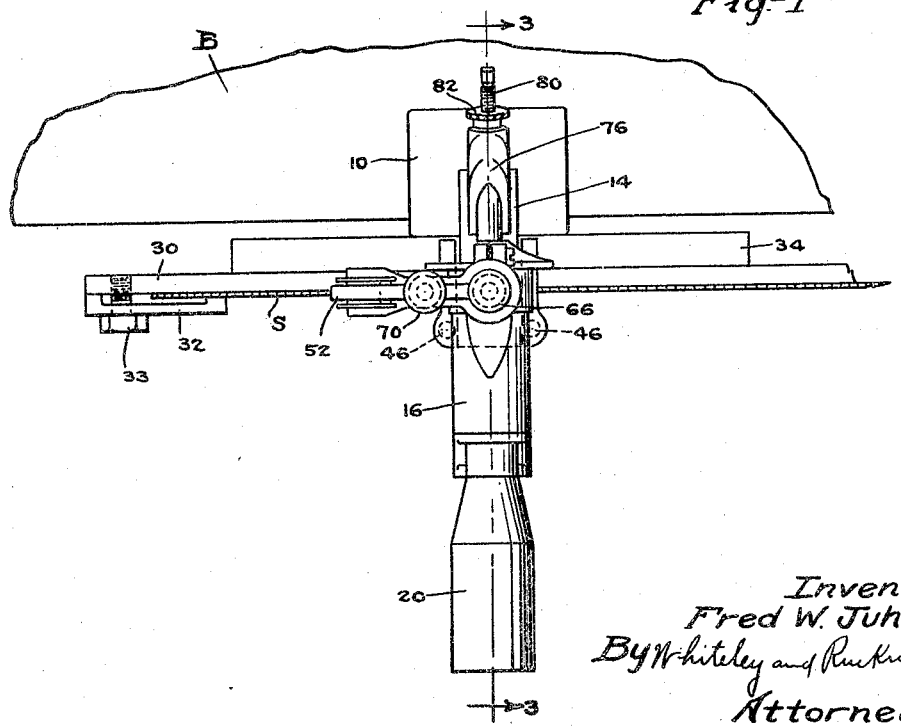
Inventor
Fred W. Juhl.
By Whiteley and Ruckman
Attorneys.

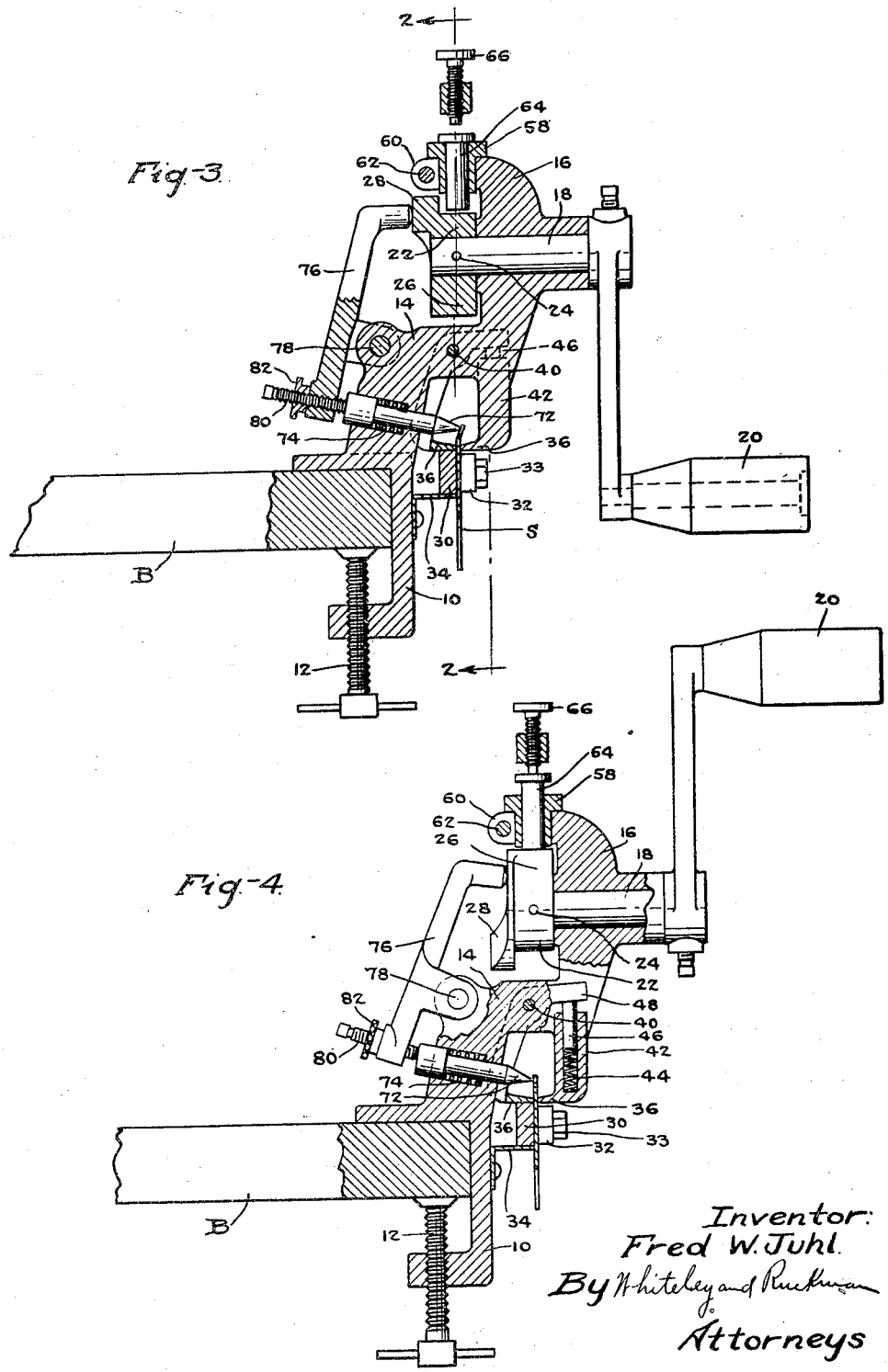

Patented Mar. 3, 1931

1,794,695

UNITED STATES PATENT OFFICE

FRED W. JUHL, OF MINNEAPOLIS, MINNESOTA; TECKLA J. JUHL ADMINISTRATRIX OF SAID FRED W. JUHL, DECEASED

SAW-SETTING MACHINE

Application filed April 19, 1929. Serial No. 356,323.

My invention relates to saw-setting machines, and an object is to provide a simple and efficient machine for setting the teeth of handsaws, bandsaws and other saws. Another object is to provide means for moving the saw with a step-by-step movement in combination with means for operating a setting tool during the periods when the saw is at rest. Another object is to provide for ready adjustment of the operating parts of the machine so that the teeth of saws of different size and character may have the teeth thereof properly set.

The full objects and advantages of my invention will appear in connection with the detailed description thereof, and the novel features of my inventive idea will be particularly pointed out in the claims.

In the accompanying drawings which illustrate a practical embodiment of my invention,—

Fig. 1 is a top plan view of the machine. Fig. 2 is a view in vertical section on the line 2—2 of Fig. 3. Fig. 3 is a view in vertical section on the line 3—3 of Fig. 1. Fig. 4 is a view similar to Fig. 3 except that it shows the movable parts turned into another position.

The machine may be supported in any suitable manner and as shown, it has a base member 10 which is shaped to form a clamp and is provided with a clamping screw 12 by means of which it may be secured to a bench B. The base member 10 carries a standard 14, the upper portion of which is offset forwardly and so shaped as to constitute a bearing 16 for a shaft 18, the front end of which is provided with suitable operating means such as a crank handle 20. The rear end of the shaft 18 carries a cam wheel 22 which is rigid therewith and as shown may be separately constructed and secured to the shaft by a pin 24. The wheel 22 is provided with a peripheral cam 26 and a face cam 28, these two cams being positioned substantially 180° from each other as will be understood from Figs. 3 and 4. In order to operate upon the teeth of a saw such as indicated by the letter S, a bar 30 is clamped to the saw by clamping pieces 32 which are held down upon the ends of the saw by screwbolts 33 as will be understood from Figs. 1 and 2. The base member 10 carries a horizontal flange 34 upon which the bar 30 is adapted to rest as shown in Figs. 3 and 4 while the saw is held between the jaws of a resilient vise. This vise has a fixed jaw 36 and a resiliently held jaw 38 constituting part of a U-shaped lever, the branches 39 of which are hinged at 40 to the standard 14. The fixed jaw 36 is carried by a socket member 42 which depends from the casing and which contains two sockets in which there are springs 44 which engage the lower end of pins 46. The upper end of the pins 46 engage the outturned end 48 of the branches 39 carrying the jaw 36 so that this jaw is held resiliently toward the fixed jaw 36, by the springs 44. In order to feed the saw with a step-by-step movement, a pawl 50 is pivotally attached to the lower end of a bell crank lever 52 intermediately pivoted at 54 to the outer end of a horizontal arm 56 whose inner end carries a tubular member 58 which fits in an opening formed in a split lug 60, the two members of which carry a screw 62 which when turned down, secures the tubular member 58 and its arm 56 from rotative movement. The tubular member 58 slidably carries a pin 64 having a head upon its upper end which is adapted to engage the lower end of an adjustable screw 66 carried by the upper end of the bell crank 52. When the cam wheel 22 is rotated in the direction of the arrow, shown in Fig. 2, the cam 26 engages the lower end of the pin 64 and swings the lever 52 and the pawl 50 toward the right. It is to be noted that a spring 68 secured at one end to the arm 56 and at the other end to the lever 52 normally holds the lever 52 in the position shown in Fig. 2. The upper arm of the lever 52 carries an adjustable screw 70, the lower end of which engages the arm 56 and limits the swinging movement of the lever 52 toward the left. It is apparent that the extent of swinging movement of the lever 52 and pawl 50 may be varied by turning the screws 66 and 70 in one direction or the other so that the pawl 50 may be caused to feed the saw the distance of two teeth of various saws regardless of the distance between the teeth so that different saws may be conditioned by the machine. In order to maintain the screws 66 and 70 in their adjusted position, a spring pressure device 71 is placed between them, this device being located in a recess in the upper end of the lever 52. The lower portion of the standard is provided with a recess through which a setting tool 72 stands. The forward end of this tool is beveled so as to properly engage the teeth of a saw one at a time. A coiled spring 74 in the recess just referred to engages the head of the tool 72 and normally holds it in retracted position as shown in Fig. 4. A lever 76 is intermediately pivoted at 78 to the standard 14. The lower end of this lever carries an adjustable screw 80, the forward end of which is in engagement with the head of the tool 70. The upper end of this lever is turned in so that it is engaged by the cam 28 once for every rotation of the cam wheel 22. A lock nut 82 on the screw 80 maintains it in its adjusted position.

The operation and advantages of my invention will be understood in connection with the foregoing description. In order to set the teeth of saws such as handsaws, the bar 30 is secured to the saw blade in the manner previously described and this bar carrying the saw is placed between the flange 34 and the resilient jaw 36 so that the bar may be guided thereby, it being understood that the width of the bar is such that it will slide smoothly between said flange and jaw. The blade of the saw is loosely gripped between the two jaws of the vise. Upon rotation of the driving shaft 80 in the direction of the arrow in Fig. 2, the cam 26 for each rotation will cause the feeding pawl 50 to swing toward the right and feed the saw for the distance between two teeth thereof, it being understood that this distance may be accurately regulated in respect to the feed by means of the two screws 66 and 70. When the cam 26 moves away from the pin 64, the spring 68 immediately returns the pawl 50 to its original position, it being apparent that the pawl rests lightly by gravity upon the saw teeth in the inclined position shown in Fig. 2, so that there is very little resistance to its return movement. While the saw blade is at rest, the cam 28 causes the setting tool 72 to be advanced and set the tooth which is adjacent thereto as shown in Fig. 3. As soon as the cam 28 runs off the upper end of the lever 76, the spring 74 immediately retracts the setting tool so that the saw may be given another advance movement. As has been stated, the tool 72 acts only upon alternate teeth so that therefore in order to complete the setting operation, the saw is turned the other side out and fed through again. In case it is desired to feed the saw toward the left instead of toward the right, as shown in Fig. 2, the screw 62 is loosened and the arm 56 is swung through 180° into the position indicated by dotted lines. Upon again tightening the screw 62, the setting operation may be performed in the manner previously stated, the only difference being that the direction of feed is reversed.

I claim:

1. A saw-setting machine comprising a driving shaft, a cam carried by said shaft, a slidable member operated by said cam, an arm supported for 180° adjustment around the axis of said slidable member, mechanism supported by said arm and operated by said cam for feeding a saw step-by-step, a setting tool, and mechanism for moving said tool transversely to the line of feed during the intervals between feeding movements of the saw.

2. A saw-setting machine comprising a driving shaft, two cams carried by said shaft substantially 180° from each other, a slidable member operated by one of said cams, an arm supported for 180° adjustment around the axis of said slidable member, a lever intermediately pivoted to said arm with one end thereof engaged by said slidable member, a pawl carried by the other end of said lever for feeding a saw step-by-step, and a setting tool operated by the other of said cams transversely to the line of feed during the intervals between feeding movements of the saw.

In testimony whereof I hereunto affix my signature.

FRED W. JUHL.